United States Patent [19]

Goebel et al.

[11] Patent Number: 4,682,620
[45] Date of Patent: Jul. 28, 1987

[54] CLEAN-GAS CONTINUOUS-FLOW INTERMEDIATE STORAGE OR ACCUMULATOR PLANT

[75] Inventors: Konrad Goebel, Erlangen; Ulrich Schiffers, Eckental, both of Fed. Rep. of Germany

[73] Assignee: Kraftwerk Union Aktiengesellschaft, Mülheim/Ruhr, Fed. Rep. of Germany

[21] Appl. No.: 745,627

[22] Filed: Jun. 17, 1985

[30] Foreign Application Priority Data

Jun. 20, 1984 [DE] Fed. Rep. of Germany ....... 3422885

[51] Int. Cl.⁴ .................. G05D 16/00; F17D 1/20
[52] U.S. Cl. ................. 137/110; 137/256; 137/568; 137/572
[58] Field of Search ......... 137/110, 256, 568, 265, 137/571, 572

[56] References Cited

U.S. PATENT DOCUMENTS

| | | | |
|---|---|---|---|
| 3,044,481 | 7/1962 | Regan | 137/571 |
| 3,244,106 | 4/1966 | Guy | 417/244 |
| 3,572,381 | 3/1971 | Nash | 137/568 |
| 3,797,516 | 3/1974 | Forster et al. | 137/568 X |
| 3,849,662 | 11/1974 | Blaskowski et al. | 60/39.182 |

FOREIGN PATENT DOCUMENTS 685942   5/1964   Canada .................. 137/568

Primary Examiner—Martin P. Schwadron
Assistant Examiner—Stephen M. Hepperle
Attorney, Agent, or Firm—Herbert L. Lerner; Laurence A. Greenberg

[57] ABSTRACT

Clean-gas continuous-flow intermediate storage plant having at least one high-pressure accumulator, at least one low-pressure accumulator and at least one pressure-increasing compressor connected therein, and having a connection with a gas distribution line, comprising an input line to the low-pressure accumulator, and an output line from the high-pressure accumulator both connected to the gas distribution line, a connecting line connecting the low-pressure accumulator and the high-pressure accumulator to one another and having at least one pressure-increasing compressor inserted therein, and valves built into the input line to the low-pressure accumulator and the output line from the high-pressure accumulator as well as into an output line from the low-pressure accumulator and an input line to the high-pressure accumulator and respective pressure sensors connected to the valves for controlling the valves.

14 Claims, 1 Drawing Figure

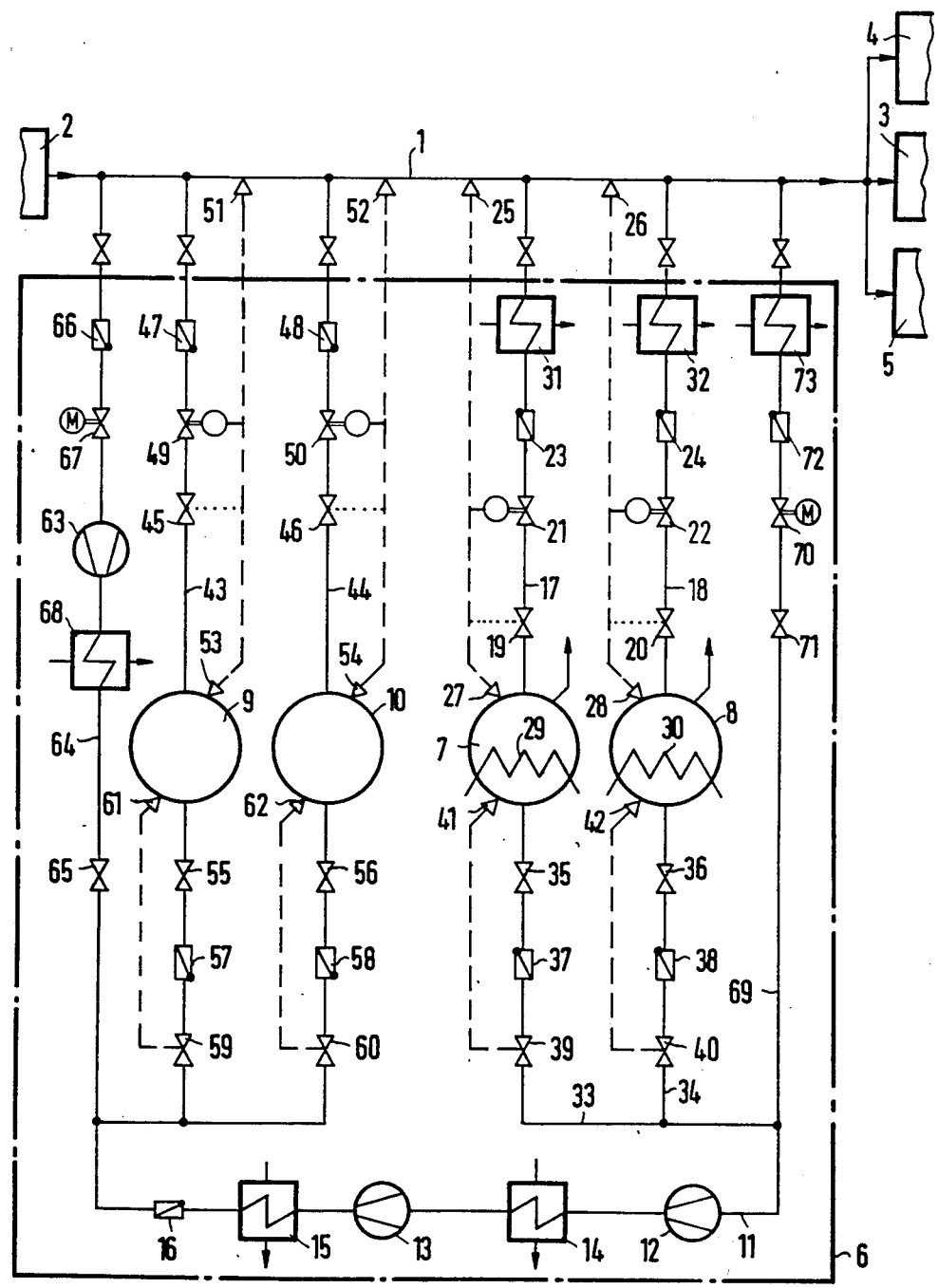

CLEAN-GAS CONTINUOUS-FLOW INTERMEDIATE STORAGE OR ACCUMULATOR PLANT

The invention relates to a clean-gas continuous-flow intermediate storage or accumulator plant for connection to a gas distribution line, the storage plant having at least one high-pressure accumulator, at least one low-pressure accumulator and at least one pressure-increasing compressor.

In a medium-load power plant or generating station with an integrated coal gasification plant for generating electric power and methanol as described in application Ser. No. 614,470, filed May 25, 1985, now U.S. Pat. No. 4,608,818, having the same corporate assignee as that of the instant application, it has been proposed, among other things, to insert between the coal gasification plant and a gas purifier following the coal gasification plant, on the one hand, and various consumers for the clean gas which is produced, on the other hand, a so-called clean-gas continuous-flow intermediate storage plant, which stores clean gas in the case of the production of an excess quantity of clean gas and which gives up or surrenders additional clean gas if the clean gas supply is insufficient. Such temporary demand for an over or undersupply of the clean gas can occur especially of the gas turbine must be driven up temporarily for compensating increasing power consumption or run down temporarily when the power consumption drops, the coal gasifier being unable to follow these fluctuating load variations. It is a peculiarity of gas turbine power generating stations, however, that they react very sensitively to pressure fluctuations in the fuel gas line. Also, in other diverse clean-gas consumers which can be connected up when the gas turbine is run down, narrow tolerances are required to maintain the pressure in the clean-gas supply line.

It is therefore an object of the invention to provide a clean-gas continuous-flow intermediate storage plant which keeps the pressure in the clean-gas line constant within narrow limits even in the event of heavy and sudden fluctuations in the supply and, particularly, in the consumption of clean gas. At the same time, it is an object of the invention to provide such a clean-gas continuous-flow interim storage plant which has the highest possible operational reliability simultaneously with lowest possible initial or capital investment costs.

With the foregoing and other objects in view, there is provided, in accordance with the invention, a clean-gas continuous-flow intermediate storage plant having at least one high-pressure accumulator, at least one low-pressure accumulator and at least one pressure-increasing compressor connected therein, and having a connection with a gas distribution line, comprising an input line to the low-pressure accumulator, and an output line from the high-pressure accumulator both connected to the gas distribution line, a connecting line connecting the low-pressure accumulator and the high-pressure accumulator to one another and having at least one pressure-increasing compressor inserted therein, and valves built into the input line to the low-pressure accumulator and the output line from the high-pressure accumulator as well as into an output line from the low-pressure accumulator and an input line to the high-pressure accumulator and respective pressure sensors connected to the valves for controlling the valves. The pressure in the gas distribution line can thereby be kept constant completely automatically within a provided band-width.

In accordance with other features of the invention, a particularly low-inertia reception or take-up of excess quantities of clean gas can be achieved if the operating pressure of the low-pressure accumulator is always kept below the minimum pressure in the gas distribution line, and the operating pressure of the high-pressure accumulator always above the maximum pressure in the gas distribution line. In such a case, it is only necessary to pen only valves for regulating the pressure, and no pumps have to be started up first.

In accordance with added features of the invention, the storage capacity as well as maximum and minimum storage pressures can be increased if each pressure-increasing compressor is followed by a heat exchanger for reducing the storage temperature. This applies as well to the installation of heat exchangers in the low-pressure accumulators, and in their input lines.

In accordance with further features of the invention, the capacity of the clean-gas continuous-flow intermediate storage plant per unit time can be increased if the high-pressure accumulator is associated with a high-pressure bypass input line which connects the high-pressure accumulator directly to the gas distribution line and is equipped with at least one pressure-increasing compressor. In addition, pumping power can be saved if the feeding is done directly into the high-pressure accumulator, because the compression must start from the pressure level of the gas distribution line and not from the lower pressure level of the low-pressure accumulators. Alternatively, according to the invention, however, a low-pressure bypass input line connected to the gas distribution line can be provided which connects the low-pressure side of the connecting line directly to the gas distribution line ahead of the first pressure-increasing compressor.

In accordance with a concomitant feature of the invention, large pressure differences between the high-pressure and the low-pressure accumulators can be bridged by connecting several pressure-increasing compressors in series in the connecting line.

Other features which are considered as characteristic for the invention are set forth in the appended claims.

Although the invention is illustrated and described herein as embodied in clean-gas continuous-flow intermediate storage or accumulator plant, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing, in which the single figure of the drawing is a schematic or circuit diagram of a clean-gas continuous-flow intermediate storage plant with two parallel-connected low-pressure accumulators and two parallel-connected high-pressure accumulators constructed in accordance with the invention.

Referring now to the figure of the drawing, there is shown therein a gas distribution line 1, through which so-called clean gas, which is generated in a non-illustrated coal gasifier and is purified in a gas purifier post-connected thereto, can be fed to a combustion chamber 3 of a gas turbine and further consumers 4 and 5 such as a methanol synthesis plant. In the illustrated embodiment, a clean-gas continuous-flow intermediate storage plant 6 connected to this gas distribution line 1 includes two low-pressure accumulators 7 and 8 and two high-pressure accumulators 9 and 10. While the two low-pressure accumulators 7 and 8 are connected in parallel with one another and the two high-pressure accumulators 9 and 10 are connected in parallel with one another, the low-pressure accumulators 7 and 8 are connected in series with the high-pressure accumulators 9 and 10 via a common connecting line 11. In the illustrated embodiment line 11 is equipped with two series-connected intermediate compressors 12 and 13. Each of the intermediate compressors 12, 13 is directly followed by a respective recooler 14, 15. In addition, a check valve 16 is built into the connecting line 11.

Each of the two low-pressure accumulators 7 and 8 is connected via a separate input line 17 and 18, respectively, to the gas distribution line 1. Into this input line 17, 18 there is built a respective shut-off valve 19, 20, a respective input control valve 21, 22 as well as a respective check valve 23, 24. Both input control valves 21 and 22 are connected to respective pressure sensors 25 and 26 which are built into the gas distribution line 1, and at which the pressure maximally allowable in the gas distribution line 1 is adjustable. In addition, these input control valves 21 and 22 or, alternatively, one of the shutoff valves 19 and 20 inserted in the respective input line 17, 18 are connected via a further pressure sensor 27, 28, respectively, which is connected to the low-pressure accumulator 7, 8 and is settable to the maximum pressure permissible in the low-pressure accumulator 7, 8. A respective cooler 29, 30 is built into the low-pressure accumulators for limiting the accumulator temperature. At least one auxiliary cooler 31, 32 can be provided in each of the input lines 17 and 18 to the low-pressure accumulators 7 and 8, respectively, for pre-cooling the clean gas flowing in.

In output lines 33 and 34 of the low-pressure accumulators 7 and 8 to the connecting line 11, there is provided, respectively, besides a shut-off valve 35, 36 and a check valve 37, 38, a low-pressure output shut-off valve 39, 40 which is controllable via a pressure sensor 41, 42 which is connected to the low-pressure accumulator 7, 8 and can be set to the maximum pressure permissible in the respective low-pressure accumulator.

Output lines 43, 44 of each of the two high-pressure accumulators 9, 10, respectively, contain, in addition to a shut-off valve 45, 46 and a check-valve 47, 48, a so-called high-pressure output control valve 49, 50. The latter is controllable via a pressure sensor 51, 52, respectively, which is connected to the gas distribution line 1 and can be set to the minimum pressure permissible in the gas distribution line 1. The high-pressure output control valves 49 and 50 or, alternatively, a respective one of the shut-off valves 45 and 46 built into the two output lines 43 and 44 of the high-pressure accumulators 9 and 10 are in addition controllable via pressure generators 53 and 54 which are connected to the associated high-pressure accumulators and settable to the minimum pressure permissible in the respective high-pressure accumulators. The high-pressure accumulators 9 and 10 are connected to the connecting line 11 via an input shut-off valve 59, 60 as well as via a shut-off valve 55, 56 and a check valve 57, 58. Each of the input shut-off valves 59 and 60 is controllable, respectively, via a pressure sensor 61, 62 which is connected to the respective high-pressure accumulator 9, 10 and is settable to the maximum pressure of the latter.

In the illustrated embodiment, there is connected parallel to the two-high-pressure accumulators 9 and 10, a high-pressure bypass input line 64 which is provided with a single pressure-increasing compressor 63 as well as with a motorized control valve 67 via a shut-off valve 65 and a check valve 66. The pressure-increasing compressor 63 in the high-pressure bypass input line 64 is followed by a heat exchanger 68. In the illustrated embodiment, there is also connected a low-pressure bypass input line 69 which can be used as an alternative to the high-pressure bypass input line 64. The low-pressure bypass input line 69 connects the gas distribution line 1 to the low-pressure side of the connecting line 11. In this low-pressure bypass input line 69, a motorized control valve 70 is connected in series with a shut-off valve 71 and a check valve 72. In the illustrated embodiment, an auxiliary cooler 73 is installed in the line 69 for cooling the clean gas.

If, as a result of decreased clean gas consumption, for example, due to a reduction in the output of the gas turbine, the pressure in the gas distribution line 1 is increased, the pressure sensors 25 and 26 built into the gas distribution line 1 control the input control valves 21 and 22 in the input lines 17 and 18 leading to the low-pressure accumulators 7 and 8 when a preset maximum pressure is exceeded. The input control valves 21 and 22 are mutually interlocked, however, via a non-illustrated selection circuit in such a manner that only one can be controllably adjusted at any time via the associated pressure sensor, while the other input control valve or valves remain closed. Then, the excess clean gas flows through the thus controllably adjusted open input line and the auxiliary cooler provided in that input line and into the corresponding low-pressure accumulator. It is of importance, in this regard, that the pressure in the low-pressure accumulator be always below a valve which is lower than the minimum pressure in the gas distribution line. The low-pressure accumulator 7 or 8 then accepts the excess clean gas in accordance with the setting of the input control valve 21 or 22 controlled by the respective pressure sensor 25, 26, so that the minimum pressure in the gas distribution line 1 is maintained. If the low-pressure accumulator reaches its maximally permissible pressure in this manner, the pressure sensor 27, 28 attached to the low-pressure accumulator 7, 8 adjusts the input control valve 21, 22 down and adjustingly addresses the next input control valve via the selection circuit. The next input control valve is then controllably adjusted or turned up, in turn, via its associated pressure sensor 25 or 26 in accordance with the gas supply and the gas pressure, respectively, in the gas distribution line 1. In the illustrated embodiment, the control line for the pressure sensor 27, 28 of the low-pressure accumulator 7, 8 was connected to the respective input control valve 21, 22. However, it would also be possible to control the shut-off valve 19, 20, which is connected in series therewith by means of the pressure sensor at the low-pressure accumulator, instead of the input control valve.

The instant one of the low-pressure accumulators 7 and 8 has reached its present maximum pressure and has been shut off from the gas distribution line 1, the low-pressure output shut-off valve 39, 40 is controllably adjusted or turned up via a switching logic system and a further pressure sensor 41, 42 connected to the low-pressure accumulator, the intermediate compressors 12,

13 in the connecting line 11 are switched on, and one of the input shut-off valves 59, 60 of one of the high-pressure accumulators is controllably adjusted or turned up. In this manner, the filled-up low-pressure accumulator is again pumped empty and one of the high-pressure accumulators is charged or filled with the pumped-out clean gas.

Each of the high-pressure accumulators 9, 10 is provided with a pressure sensor 61, 62 for the maximally permissible pressure. Via these pressure sensors 61 and 62, the associated input shut-off valve 59, 60 to the connecting line 11 is closed again and the next input shut-valve is opened when the high-pressure accumulator has reached its maximally permissible pressure.

If the gas pressure in the gas distribution line 1 drops below a minimum value, the high-pressure output control valves 49, 50 are controllably adjusted or turned up via the pressure sensors 51 and 52, respectively, to an extent required for keeping the pre-set minimum pressure in the gas distribution line.

To avoid unstable states which degrade control accuracy, only one of the mutually parallel-connected high-pressure accumulators 9 and 10, respectively, is simultaneously emptied. If the pressure in this high-pressure accumulator has dropped below a pre-settable minimum pressure, either the associated high-pressure output control valve 49, 50 or a shut-off valve 45, 46 connected to the same output line is closed via a pressure sensor 53, 54 connected to this high-pressure accumulator. Via an otherwise non-illustrated switching logic system, the high-pressure output control valve and the shut-off valve, respectively, of the next high-pressure accumulator which yet remains filled is controllably adjusted or turned up simultaneously. The position or setting of the high-pressure output control valves is determined by the associated pressure sensor 51, 52. The further feeding of clean gas into the gas distribution line 1 is thus taken over by the other high-pressure accumulator. Assurance is provided by an appropriate interlocking of the individual valves that a high-pressure accumulator cannot be filled simultaneously via the intermediate compressors 12, 13 and deliver clean gas to the gas distribution line 1. Therefore, the input shut-off valve 59, 60 of the same high-pressure accumulator is always closed via the associated non-illustrated addressing logic system when the shut-off valve 45, 46 and the high-pressure output control valve 49, 50 in the same output line 43, 44 are open.

In an analogous manner, the valves on both sides of the low-pressure accumulators 7 and 8 are also mutually interlocked, so that no low-pressure accumulator can be emptied via the intermediate compressor 12, 13 built into the connecting line, if clean gas simultaneously flows into one of these low pressure accumulators via an input line 17, 18 from the gas distribution line 1. Therefore, the low-pressure output shut-off valve of the same low-pressure accumulator is simultaneously closed via an addressing logic system if the input control valve is opened. In this case, too, the shut-off valve 19, 20 can alternatively be controlled in opposite sense to the low-pressure output shut-off valve 39, 40. Through this mutual interlocking of the input and output lines of each of the low-pressure accumulators, on the one hand, and of the input and output lines of the parallel-connected accumulators, on the other hand, unstable states adversely affecting the control accuracy of the input control valves 21 and 22 are avoided.

For equalizing a major gas excess or surplus in the gas distribution line 1, the high-pressure bypass input line 64 can be placed into operation in this clean-gas continuous-flow storage system 6 by opening from a control station the corresponding motorized control valve 67, and setting the pressure-increasing compressor 63 in operation. Major gas excess quantities can thereby be fed directly into one of the high-pressure accumulators 9 and 10. This gas acceptance via the high-pressure bypass input line can take place alternatively or also additively to the gas acceptance via one of the low-pressure accumulators. Alternatively to this solution, it is also possible to intercept major excess quantities of gas by providing a low-pressure bypass input line 69, as is shown in the embodiment illustrated in the drawing. By turning up or controllably adjusting the motorized control valve 70 built into the low-pressure bypass input line 69, additional amounts of gas can be pumped into one of the high-pressure accumulators 9 and 10 via the connecting line 11, the pump capacity of the intermediate compressors 12 and 13 being of appropriate design. If larger amounts of excess gas are accepted, setting the high-pressure bypass input line 64 or the low-pressure bypass input line 69 in operation is more economical, because the compression must take place from the higher pressure level of the gas distribution line and not from the lower pressure level of one of the low-pressure accumulators 7 and 8.

For reasons of control engineering, the shut-off valves 19 and 20 in the input lines 17 and 18, respectively, of the low-pressure accumulators are also always closed simultaneously when the motorized control valves 67 and 70 are opened. By adding intermediate coolers 14, 15 behind the individual compressors 12 and 13 and putting auxiliary coolers 31, 32 and 33 ahead of the individual compressors 12 and 13, the gas temperature in the individual accumulators 7 to 10 can be limited to maximally permissible values. The storage capacity in these accumulators can thereby be increased. The coolers built into the low-pressure accumulators permit them to be kept at a predetermined temperature level.

There is claimed

1. Clean-gas continuous-flow intermediate storage plant having at least one high-pressure accumulator, at least one low-pressure accumulator and at least one pressure-increasing compressor connected therein, and having a connection with a gas distribution line, the low-pressure accumulator being constructed for a range of operation below a minimum pressure of the gas distribution line, and the high-pressure accumulator being constructed for a range of operation above a maximum pressure of the gas distribution line, comprising an input line to the low-presure accumulator, and an output line from the high-pressure accumulator both connected to the gas distribution line, a connecting line connecting the low-pressure accumulator and the high-pressure accumulator to one another and having the at least one pressure-increasing compressor inserted therein, and valves built into the input line to the low-pressure accumulator and the output line from the high-pressure accumulator as well as into an output line from the low-pressure accumulator and an input line to the high-pressure accumulator and respective pressure sensors connected to said valves for controlling said valves, the pressure sensor connected to the respective valve in said input line to the low-pressure accumulator being connected to the gas distribution line and being constructed for opening the respective valve in said input line to the low-pressure accumulator at pressures above a given maximum pressure in the gas distribution line, the pressure sensor connected to the respective valve in said output line from the high-pressure accumulator being connected to the gas distribution line and being constructed for opening the respective valve in said output line from the high-pressure accumulator at pressures below a given minimum pressure in the gas distribution line.

2. Clean-gas continuous-flow intermediate storage plant according to claim 1 wherein the valve in said input line to the low-pressure accumulator is constructed as a control valve.

3. Clean-gas continuous-flow intermediate storage plant according to claim 1 wherein the valve in said output line from the high-pressure accumulator is constructed as a control valve.

4. Clean-gas continuous-flow intermediate storage plant according to claim 1 wherein a high-pressure bypass input line having at least one pressure-increasing compressor connected therein and being assigned to the high-pressure accumulator directly connects the high-pressure accumulator to the gas distribution line.

5. Clean-gas continuous-flow intermediate storage plant according to claim 1 including a connecting line mutually connecting the low-pressure accumulator and the high-pressure accumulator and having connected therein a pressure-increasing compressor, and a low-pressure bypass input line connected to the gas distribution line and to said connecting line at a low-pressure side thereof located downstream of said pressure-increasing compressor.

6. Clean-gas continuous-flow intermediate storage plant according to claim 4 wherein said high-pressure bypass input line has a remotely controlled valve connected therein.

7. Clean-gas continuous-flow intermediate storage plant according to claim 5 wherein said low-pressure bypass input line has a remotely controlled valve connected therein.

8. Clean-gas continuous-flow intermediate storage plant according to claim 1 including a connecting line mutually connecting the low-pressure and the high-pressure accumulators, and a plurality of pressure-increasing compressors connected in series in said connecting line.

9. Clean-gas continuous-flow intermediate storage plant according to claim 8 wherein a respective heat exchanger is post-connected to each of said plurality of pressure-increasing compressors for reducing storage temperature.

10. Clean-gas continuous-flow intermediate storage plant according to claim 1 including a heat exchanger connected in said input line from the gas distribution line to the low-pressure accumulator for reducing storage temperature.

11. Clean-gas continuous-flow intermediate storage plant according to claim 1 including a heat exchanger built into the low-pressure accumulator for reducing storage temperature.

12. Clean-gas continuous-flow intermediate storage plant according to claim 4 including a heat exchanger connected in said high-pressure bypass input line.

13. Clean-gas continuous-flow intermediate storage plant according to claim 5 including a heat exchanger connected in said low-pressure bypass input line.

14. Clean-gas continuous flow intermediate storage plant according to claim 7 including at least two of said low-pressure accumulators, and wherein said control valves connected in said low-pressure input lines are interlocked with a respective one of said valves built into the input lines to the other low pressure accumulators.

* * * * *